May 30, 1939.    A. H. DALL ET AL    2,160,778
BEARING
Filed June 2, 1936    3 Sheets-Sheet 1

INVENTORS
Albert H. Dall
BY   Hans Ernst
ATTORNEYS

May 30, 1939. A. H. DALL ET AL 2,160,778
BEARING
Filed June 2, 1936 3 Sheets-Sheet 2
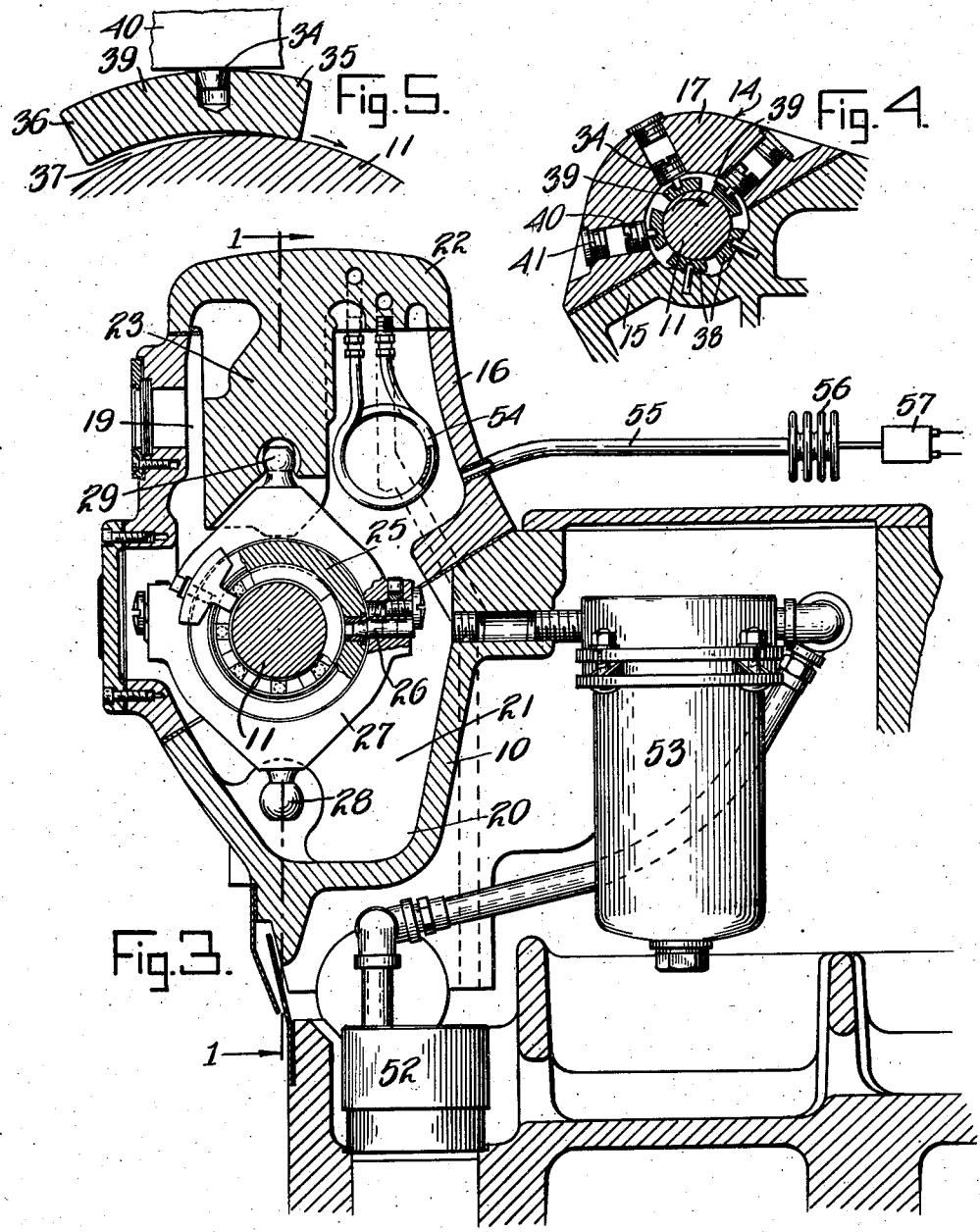
INVENTORS
Albert H. Dall
BY Hans Ernst
ATTORNEYS

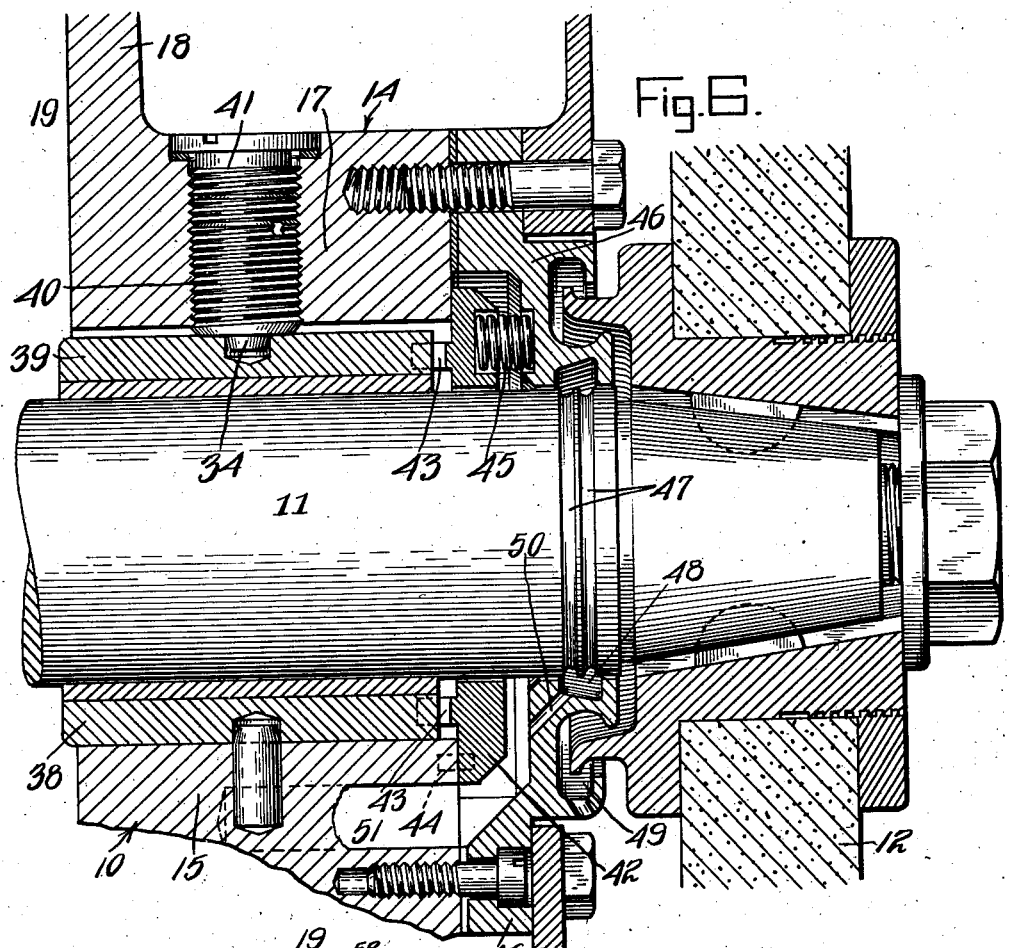

Patented May 30, 1939

2,160,778

UNITED STATES PATENT OFFICE 2,160,778

BEARING

Albert H. Dall and Hans Ernst, Cincinnati, Ohio, assignors to Cincinnati Grinders Incorporated, Cincinnati, Ohio, a corporation of Ohio Application June 2, 1936, Serial No. 83,018

9 Claims. (Cl. 308—73)

This invention relates to bearings and the construction and operation thereof. One of the objects thereof is to provide a bearing of simple and thoroughly practical construction. Another object is to provide apparatus of the above nature of efficient and dependable action. Another object is to provide apparatus of the above nature characterized by extreme accuracy in action under widely varying conditions of use. Another object is to provide a practical art for giving an accurate and efficient bearing surface for a rotating part which can be conveniently carried on with dependable results. Other objects will be in part obvious and in part pointed out hereinafter.

The invention accordingly consists in the features of construction, combinations of elements, arrangements of parts and in the several steps and relation and order of each of the same to one or more of the others, all as will be illustratively described herein, and the scope of the application of which will be indicated in the following claims.

In the accompanying drawings, in which is shown one of the various possible embodiments of the mechanical features of this invention, Figure 1 is a sectional elevation taken along the line 1—1 of Figure 3;

Figure 3 is a sectional elevation taken substantially along the line 3—3 of Figure 1;

Figure 4 is a detailed cross-section of a bearing;

Figure 5 is a diagrammatic view of a rocker shoe and related parts;

Figure 6 is a sectional longitudinal elevation of a bearing on a larger scale; and Figure 7 is a diagrammatic plan of electrical and oil circuits.

Similar reference characters refer to similar parts throughout the several views of the drawings.

In order to afford a ready grasp of certain features of this invention, it may be noted that in some types of apparatus, as, for example, centerless grinding machines, it is desired to maintain the axis of a rotating part substantially unchanged under widely varying conditions of load and speed and yet to avoid friction or inefficiency of lubrication. The attainment of means for achieving this result is among the dominant aims of this invention.

Figure 1:
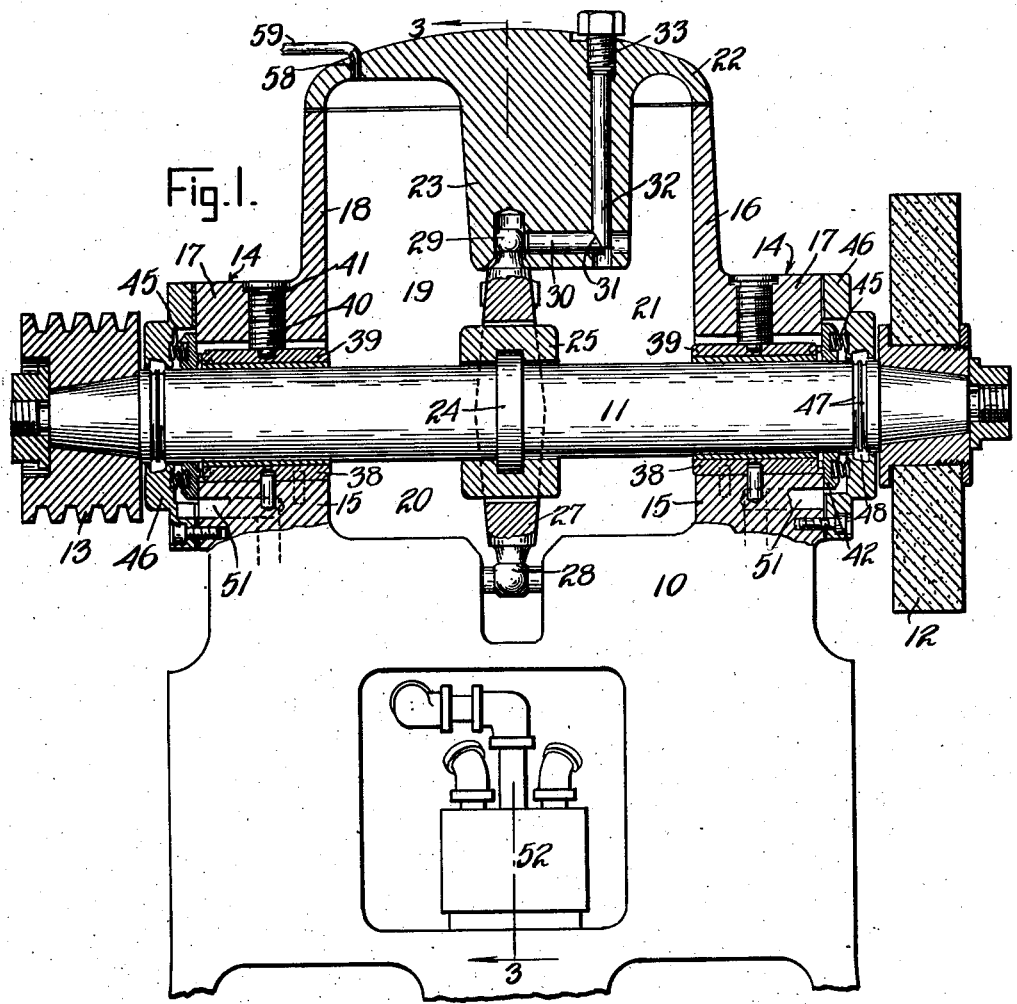
Figure 2:
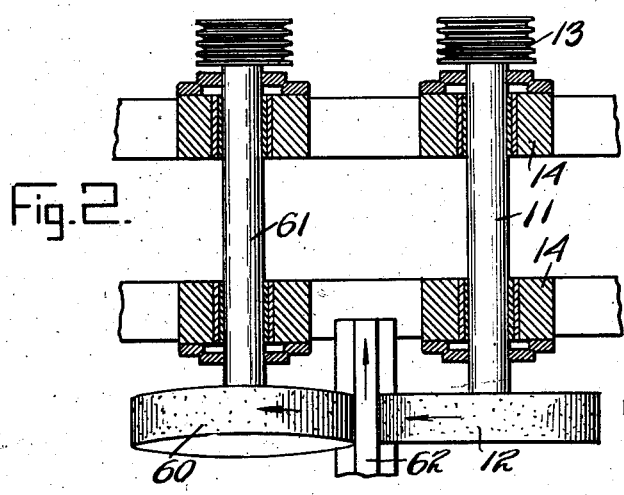
Figure 2 is a diagrammatic sectional plan of a centerless grinding machine provided with the bearing construction shown in Figure 1.

Referring to Figure 1 of the drawings, there is shown at 10 the frame of a grinding machine which may be of the centerless type, as indicated in Figure 2. In this frame is mounted a shaft or spindle 11 having secured at one end a grinding wheel 12 and at its opposite end a driving pulley 13. This shaft is provided at 14 with bearings of substantially identical construction, the lower portion of which rests within housing 15 formed in the frame 10 and generally indicated in Figure 4. An upper casting 16 is provided with portions 17 which complete the housings of the bearings and with a central fold 18 surrounding a space 19 which registers with a recess 20 in the frame and together therewith provides a chamber 21. This chamber is capped by a head casting 22 having an integral depending projection 23. It is to be understood that the casting 16 is removable with respect to the machine frame and has a tight joint therewith, and that in like manner the head 22 is removable from this casting and yet tightly connected therewith.

Shaft 11 is provided near its center with a shoulder 24 which rests within a double thrust bearing in a collar 25. This collar, as will be seen in Figure 3 of the drawings, is pivotally supported by horizontal trunnions 26 formed in a frame 27 which is seated by a ball joint 28 in the frame of the machine. At the upper end of this swinging support 27 there is provided a ball joint connection 29 with the downward projection of head 22, as shown in Figures 1 and 3 of the drawings. The ball joint 29 is rigidly held in position by a slidable pin 30 having a bevelled end 31 coacting with a similar bevel at the lower end of a pin or rod 32 which is rigidly held in place by a screw 33 threaded into the upper portion of the head. In this manner the double thrust bearing for the shaft 11 is firmly and dependably held in an exactly predetermined position, and it is to be understood that, by the use of suitable devices such as shims or bearing screws, this position may be adjusted or varied if desired.

Turning now to the construction of the main bearings for the shaft, reference is first made to Figure 4 of the drawings in which there are shown a plurality of rocker shoes surrounding the journal and here shown as five in number. Each of these shoes is provided with an inner bearing surface of a radius of curvature substantially equal to that of the surface of the shaft with which it is to cooperate. Each shoe, furthermore, is mounted to rock about an axis parallel with the axis of the shaft and unequally positioned with respect to the circumferential dimension of the shoe. This is diagrammatically indicated in Fig. 5, and it is to be noted that the pivot 34 about which the shoe rocks is substantially nearer the circumferential end 35 than it is to the end 36. A slight clearance is provided between the inner surface of the bearing shoe and the outer surface of the shaft, and assuming the latter to rotate in the direction indicated by the arrow in Figure 5, the shoe will, when submerged in oil, assume a position with its longer forward portion toward the end 36 slightly raised from the shaft, whereas the trailing end 35 is almost in contact with the shaft surface. This provides a curved recess 37 which is tapering or wedge-shaped to much less thickness in the direction of rotation of the shaft. These so-called rocker bearing shoes are not broadly novel, and the automatic assumption of the position indicated in exaggerated form in Figure 5 is due to causes which it is unnecessary here to discuss in detail as they are known in the art.

Reverting to Figure 4 of the drawings, it will be seen that the two lower rocker shoes 38 are mounted within the lower portion of the housing and without capacity for adjustment in a radial direction. The three remaining shoes 39, however, are each provided with a pivot screw 40 and an outer adjusting screw 41 by which their position in a radial direction may be varied at will. It will thus be seen that by a suitable adjustment of the three movable shoes 39, the five shoes may be forced against the shaft with any desired degree of pressure as their capacity for rocker action permits them to swing into such position as will best follow the adjustment of the screws 41. In this manner the bearing or shaft may be pre-loaded with an initial pressure of any desired value even though the machine be running free without any load on the bearing due to work.

In the preferred method of use of this apparatus we may assume that the resultant pressure upon the bearing, when the machine is at work, is substantially in the direction indicated by the large arrow in Figure 4 of the drawings. This pressure may be the result of the forces due, for example, to pressure on the abrasive wheel, pull of the driving belt, and weight of the parts. Assuming that this resultant pressure amounts, for example, to 800 lbs. while the machine is at average work, it is preferred to so pre-load the bearing by adjustment of rocker shoes that the idling pressure will be about 2000 lbs. in the direction of the arrow and 2000 lbs. in the opposite direction. The net 800 lb. pressure in a direction opposite the arrow, in order to meet the load when the machine starts work, may thus be attained by such action as will reduce the 2000 lbs. of pre-load in the direction of the arrow to 1600 lbs. and increasing the 2000 lbs. of pre-load pressure to 2400 lbs. in a direction opposed to the arrow. It is found that with this arrangement more accurate and dependable results are achieved in meeting the load than would be gained with a bearing which has no initial idling load.

Turning to Figure 6 of the drawings, it will be seen that the length of the shoes in the direction of the axes about which they swing is substantially equal to the length of the bearing, and that at their inner ends they are in communication with the chamber 21. At the outer end of each bearing, however, there is provided an oil ring 42 the inner surface of which fits the shaft with just sufficient clearance to permit oil to escape outwardly at the desired rate. This rate of escape of the oil will be governed largely by the pressure, as hereinafter described, and it is to be understood that it forms a slow leakage sufficient to remove the heated and used oil at the proper rate. Also this outward current of oil serves to insure against inward leakage of air into the bearing. Rings 42 are provided with interference lugs as at 43 to coact with the rocker shoes so as to insure the assembly of the latter in correct positions. Also the rings are preferably held against rotation by a sliding fit with a pin extending from the housing as diagrammatically indicated at 44. These rings fit the adjacent upright surfaces of the housing to form an oil-tight joint, being resiliently and yet firmly urged in position by a series of coiled springs 45 seated at their outer ends in the collar 46. Beyond the oil rings the shaft is provided with oil grooves 47 coacting with a groove 48, and if this groove should become filled with escaping oil, it drains over into groove 49 and escapes. The passage 50 leads from groove 48 to a drainage passage 51 which terminates in the sump, as hereinafter described.

The oil chamber 21 is supplied with oil under pressure from a suitable oil pump 52, the incoming oil passing first through a filter 53, as shown in Figure 3 of the drawings, and finally through a resistance coil 54 by which it is quietly discharged into the pressure chamber at the desired rate. This resistance coil may be mounted in the head 22, as shown in Figure 3, and the oil passages are formed in part by suitable tubing and in part cored or machined out of the castings in the well-known manner.

Leading from pressure chamber 21 is a pressure tube 55 which terminates in an expansible bellows device 56 controlling an electric switch 57 and closing the same when the pressure within the chamber has reached the desired value.

At the upper end of the chamber and in the head 22 there is mounted a small outlet or vent 58 from which a tube 59 leads to the sump.

Referring briefly to the diagrammatic illustration of a centerless grinding machine, Figure 2 of the drawings, with which the construction and action herein disclosed is especially well suited to coact, there is shown at 60 a regulating wheel operatively related to the grinding wheel 12 and driven by a shaft 61 substantially parallel to the shaft 11. It is to be understood that the bearings for shaft 61 are of the same type as those above described in connection with the shaft 11 and that in the usual manner the regulating wheel serves to rotate and feed the work in the direction indicated by the arrow upon the work support 62. In a machine of this sort the maintenance of a fixed axis of rotation of the parts is vital to accuracy with which the grinding is done by these two coacting abrasive wheels between which the work passes. Furthermore, the pressure of the work on these wheels is toward their respective shafts in a substantially horizontal direction, and this pressure, when combined with the forces due to the weight of the parts, pull of the driving belt, and the like, may well give a resultant substantially as in Figure 4.

For a general understanding of the relation of the various parts, reference is made to the diagrammatic Figure 7 in which the sump is indicated at 63 into which is discharged the oil from the escape tube 59 and the drainage conduits 51. The oil pump 52 draws oil from the sump as by the pipe 64 and discharges it through filter 53 and resistance coil 54 as before described.

The expansible bellows 56 controls the switch 57 which governs a circuit through a relay coil 65 which is connected through a suitable resistance 66 across the mains 67. Relay coil 65 closes relay 68 which either directly or through additional relays or starters sets the main driving motor 69 into action to drive the machine. The initial pressure is built up by the motor 70 which drives the oil pump 52 and whose circuit is controlled by the hand switch 71.

It may here be noted that the term "oil" is used throughout in a broad sense to comprehend any liquid suitable to bring about the action herein described.

Considering now the action of this apparatus, when it is desired to start the machine the switch 71 is closed which sets the motor 70 in action and the oil pump 52 starts to discharge oil into the pressure chamber 21. This oil, having passed through the filter, is not only cleaned but has any contained air largely removed thereby. As the oil fills the chamber 21, the air therein, as well as that displaced in the bearings, rises to the top and passes out through the vent tube 59 into the sump from which it rises and escapes. When the chamber 21 is full, the only escape is through the restricted passages of the oil seals in the outer ends of the bearing and through the fine vent orifice 58. The continued actuation of the pump thereupon raises the pressure in the chamber 21 and by expansion of the unit 56 and closing of the electrical devices controlled thereby starts the main driving motor 69. The pump accordingly forms a positively acting means for creating pressure as distinguished from means of the non-positive type such as a hydrostatic head. The machine is then in operation and the pump maintains the pressure at the desired amount, a suitable adjustable relief valve of a well-known form being preferably provided at 72, as shown in Figure 7, and when opened discharging as by the tube 73 into the sump.

There is during the action of the machine a slight continuous escape at the vent 58, and this insures that any air which might for any reason be found in the oil within chamber 21, will gradually rise to the top and pass off with the escaping oil.

There is thus maintained in the chamber and the bearings communicating therewith an abundant supply of oil free from air and under a pressure of exactly the desired amount. This pressure not only insures a continuous outflow of oil at the outer ends of the main bearings, with the advantages before set forth, but eliminates turbulence, thus greatly enhancing the accuracy of action of the bearing. Referring to the diagrammatic Figure 5, the rapidly rotating shaft carries with it a film of oil which, due to centrifugal force, tends to form outward currents which are irregular in form and intensity. These currents, and also the tendency to turbulence produced by the outward flow of the oil as it escapes from the trailing edges of the shoes, would, unless combatted, give an irregularity in action to the entire apparatus. The maintenance of the exact axis of the shaft in unchanged position depends as one factor upon the inflow of oil into the tapering recess 37, and obviously the uniformity of action of this is interfered with by turbulence in the liquid which may result in currents either toward or away from the inlet or at an angle thereto, all of uncertain character as above noted.

The use of a substantial pressure, however, tends to neutralize centrifugal force and other disturbing factors upon the body of oil and prevents this turbulence and the lack of uniformity in action which might result therefrom. Furthermore this pressure reduces to a minimum any chance of cavitation which is particularly harmful at the outer ends of the shoes where it might tend to suck air in past the oil seal, reversing the flow of fluid at this point.

The degree of pressure required varies widely, one of the prime factors being the rate of rotation of the shaft and hence of the film of oil adhering thereto. The pressure should exert upon the oil a force at least equal to the outward force due to centrifugal action. With slow rotating shafts, this may be attained to a substantial extent with a moderate hydrostatic head, but with high speed shafts the results are better achieved by the use of a pump or equivalent device. Also it is to be noted that by the use of very substantial pressures there is avoided any material difference in pressure between the upper and lower shoes due to the hydrostatic head resulting from the higher position of the former.

This pressure, furthermore, insures a constant flow of clean oil through the bearing which keeps it cool and well lubricated as well as avoids the entry of air. The absence of air is of particular value not only by reason of the lack of uniformity which it tends to give to the body of oil and other disturbing factors, but also on account of the material compressibility which is characteristic of oil when containing any substantial amount of air. It will also be seen that, with apparatus of the above nature and with the method of use herein described, there are no surfaces of oil exposed to the air. This also subject to agitation exposed to the air. This also is of value in removing the chance of entry of air into the body of the oil.

It will thus be seen that there is provided apparatus and an art in which the objects of this invention are achieved and which is eminently suited to the hardest conditions of practical use.

As many possible embodiments may be made of the mechanical features of the above invention and as the art herein described might be varied in various parts, all without departing from the scope of the invention, it is to be understood that all matter hereinabove set forth, or shown in the accompanying drawings, is to be interpreted as illustrative and not in a limiting sense.

This application is a continuation in part of application Serial No. 675,792 filed by us June 14, 1933.

We claim:

1. In apparatus of the general nature of that herein described, in combination, means forming a chamber having a body of oil therein, a rotatable member having a bearing surface in said chamber submerged in said oil, a series of bearing shoes extending about and operatively related to said surface, means mounting each shoe for rocking movement in a plane transverse to the axis of said rotatable member, said shoes being formed to tilt automatically to balance the effect of variations in load on said rotatable member, and positively acting means adapted to maintain said entire body of oil in said chamber under pressure and thereby enhance the uniformity of flow of oil beneath said shoes.

2. In apparatus of the general nature of that herein described, in combination, a shaft, a plurality of bearing members mounted about said shaft to coact therewith, means mounting said members for rocking movement in a plane transverse to the axis of said shaft, said shoes being formed to tilt automatically to balance the effect of variations in load on said shaft, means submerging said bearing members and the shaft rotating therein in a body of oil, and means maintaining said oil under a pressure greater than the outward pressure due to centrifugal force of the oil rotating with said shaft.

3. In apparatus of the general nature of that herein described, in combination, means forming a bearing chamber, means forming a chamber adapted to supply oil to said bearing chamber, a rotatable member within said bearing chamber, a plurality of shoes mounted about and extending entirely around said rotatable member in said bearing chamber, said shoes being formed and mounted to rock in a direction transverse to the axis of said rotatable member and adapted to tilt automatically to tend to counterbalance the effect of changes in load thereon, means adapted to maintain said bearing chamber completely filled with oil, means holding each of said shoes in a position relative to said rotatable member which will create a substantially equal pressure against said member in idling condition, said pressure being equal to at least one half of the average working load, and means adapted to maintain said oil in both of said chambers under a substantial pressure.

4. In apparatus of the general nature of that herein described, in combination, means forming a chamber having a body of oil therein, a rotatable member having a bearing surface in said chamber submerged in said oil, a series of bearing shoes extending about and operatively related to said surface, means mounting each shoe for rocking movement in a plane transverse to the axis of said rotatable member, said shoes being formed to tilt automatically to balance the effect of variations in load on said rotatable member, positively acting means adapted to maintain said entire body of oil in said chamber under pressure and thereby oppose stray currents and prevent turbulence, and means permitting a slow escape of oil adjacent the end of the bearing.

5. In apparatus of the general nature of that herein described, in combination, means forming a chamber having a body of oil therein, a rotatable member having a bearing surface in said chamber and submerged in said oil, a series of bearing shoes extending about and operatively related to said surface, means mounting each of said shoes for a rocking movement in a plane transverse to the axis of said rotatable member, said shoes being formed to tilt automatically to balance the effect of variations in load on said rotatable member, means adapted to maintain said chamber completely filled with oil, means adapted to remove air from the oil supplied to said chamber, means holding each of said shoes in a position relative to said rotatable member which will create a substantial pressure against said member in idling condition, said pressure being comparable with the normal working load, and means adapted to maintain said oil under substantial pressure.

6. In apparatus of the general nature of that herein described, in combination, a bearing comprising a rotatable member and a plurality of shoes extending about the same to coact therewith, means mounting said shoes to permit them to rock transversely of the axis of said rotatable member, means maintaining said bearing and shoes submerged in oil, means adapted to remove contained air from said oil, means permitting a slow and continuous escape of oil from the bearing, and positively acting means adapted to maintain said oil under a substantial pressure sufficient to oppose and prevent the formation of stray currents therein due to centrifugal force.

7. In bearing construction, in combination, a bearing, a shaft mounted in said bearing, a series of bearing shoes extending about and operatively related to said shaft, means mounting each shoe for rocking movement in a plane transverse to the axis of said shaft, means adapted to maintain within said bearing and submerging said shoes, a body of oil under substantial pressure, a ring about said shaft at the end of said bearing shaped to permit a slight escape of oil therefrom and a frame member and springs interposed between said frame member and said ring and forcing said ring tightly against the end of said bearing.

8. In apparatus of the general nature of that herein described, in combination, means comprising a chamber having a body of oil therein, a shaft having a bearing surface in said chamber submerged in said oil, said first means being arranged and adapted to apply to the oil about said shaft a substantial pressure against all parts of said bearing surface, a plurality of bearing shoes circumferentially disposed along and operatively related to said shaft on the side opposite to that from which the load is applied and each being positioned and adapted to create a pressure against said shaft when idling which is at least substantially equal to the average load imposed on said shaft when in loaded operation, and means mounting each shoe for rocking movement in a plane transverse to the axis of said shaft, said shoes being formed and mounted to tilt automatically to an extent to balance the effect of variations in load on the shaft.

9. In apparatus of the general nature of that herein described, in combination, means comprising a chamber having a body of oil therein, a shaft having a bearing surface in said chamber submerged in said oil, said first means being arranged and adapted to apply to the oil about said shaft a substantial pressure against all parts of said bearing surface, a plurality of bearing shoes circumferentially disposed entirely about and operatively related to said shaft and each being positioned and adapted to create a pressure against said shaft when idling which is equal to at least the average load imposed on said shaft when in loaded operation, and means mounting each shoe for rocking movement in a plane transverse to the axis of said shaft, said shoes being formed and mounted to tilt automatically to an extent to balance the effect of variations in load on the shaft.

ALBERT H. DALL.
HANS ERNST.